US012141358B2

(12) United States Patent
Saito et al.

(10) Patent No.: US 12,141,358 B2
(45) Date of Patent: Nov. 12, 2024

(54) VIBRATION DEVICE INCLUDING PIEZOELECTRIC ELEMENT THAT VIBRATES IN RESPONSE TO USER OPERATION

(71) Applicant: TDK CORPORATION, Tokyo (JP)

(72) Inventors: Kazuki Saito, Tokyo (JP); Kaoru Kijima, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days.

(21) Appl. No.: 17/908,056

(22) PCT Filed: Mar. 5, 2021

(86) PCT No.: PCT/JP2021/008800
§ 371 (c)(1),
(2) Date: Aug. 30, 2022

(87) PCT Pub. No.: WO2021/182350
PCT Pub. Date: Sep. 16, 2021

(65) Prior Publication Data
US 2023/0089456 A1 Mar. 23, 2023

(30) Foreign Application Priority Data
Mar. 11, 2020 (JP) ................. 2020-041750

(51) Int. Cl.
G06F 3/01 (2006.01)
(52) U.S. Cl.
CPC .................. G06F 3/016 (2013.01)
(58) Field of Classification Search
CPC ...... G06F 3/016; G06F 3/03547; G06F 3/038; G06F 3/041; H04R 1/00; H04R 1/02; H04R 7/06; H04R 17/00
See application file for complete search history.

(56) References Cited

U.S. PATENT DOCUMENTS

2007/0138919 A1* 6/2007 Ohki ................. H10N 30/40
310/359
2009/0147973 A1* 6/2009 Gitzinger ............... H04R 17/00
340/407.1
(Continued)

FOREIGN PATENT DOCUMENTS

JP 2010-286986 A 12/2010
JP 2012-198582 A 10/2012
(Continued)

OTHER PUBLICATIONS

Sep. 6, 2022 International Preliminary Report on Patentability issued in International Patent Application No. PCT/JP2021/008800.
(Continued)

Primary Examiner — Amy Onyekaba
(74) Attorney, Agent, or Firm — Oliff PLC

(57) ABSTRACT

In a vibration device, an operation unit has an operation surface operated by a user. A plurality of piezoelectric elements are disposed so as to overlap the operation surface when viewed from the direction orthogonal to the operation surface. The plurality of piezoelectric elements are disposed at mutually different positions in the direction along the operation surface. A control unit is arranged to control the plurality of piezoelectric elements. The control unit is arranged to vibrate the piezoelectric element corresponding to a first position on the operation surface where an operation is performed at a first frequency and vibrates the piezoelectric element corresponding to a second position on the operation surface different from the first position among the plurality of piezoelectric elements at a second frequency, in response to the operation of the operation surface. The second frequency is a frequency in the audible range.

11 Claims, 12 Drawing Sheets

(56) References Cited

U.S. PATENT DOCUMENTS

| | | |
|---|---|---|
| 2010/0315364 A1 | 12/2010 | Miyake |
| 2013/0285506 A1* | 10/2013 | Takeda .................. H02N 2/001 |
| | | 310/317 |
| 2016/0007123 A1* | 1/2016 | Mizuta .................... H04M 1/03 |
| | | 381/151 |
| 2016/0034057 A1* | 2/2016 | Ikeda ...................... H04M 1/03 |
| | | 345/173 |
| 2018/0288202 A1 | 10/2018 | Park et al. |
| 2019/0278428 A1* | 9/2019 | Tsai ......................... G06F 3/016 |
| 2021/0240267 A1* | 8/2021 | Gajiwala ............... G06F 3/0219 |
| 2023/0139722 A1* | 5/2023 | Doy ...................... G06F 3/0445 |
| | | 345/174 |

FOREIGN PATENT DOCUMENTS

| | | |
|---|---|---|
| JP | 2013-242803 A | 12/2013 |
| JP | 2013-243604 A | 12/2013 |
| JP | 2018-536359 A | 12/2018 |

OTHER PUBLICATIONS

May 25, 2021 International Search Report issued in International Patent Application No. PCT/JP2021/008800.

* cited by examiner (a)

(b)

(c)

(d)

(a)

(b)

(c)

(d)

VIBRATION DEVICE INCLUDING PIEZOELECTRIC ELEMENT THAT VIBRATES IN RESPONSE TO USER OPERATION

TECHNICAL FIELD

The present invention relates to a vibration device.

BACKGROUND ART

A known vibration device includes an operation unit operated by a user and a piezoelectric element vibrating in response to the operation of the operation unit by the user. For example, Patent Literature 1 describes an electronic device including a display and a piezoelectric element. This piezoelectric element vibrates in response to the operation of the display by a user.

CITATION LIST

Patent Literature

Patent Literature 1: Japanese Unexamined Patent Publication No. 2018-536359

SUMMARY OF INVENTION

Technical Problem

Patent Literature 1 describes the electronic device being provided with a composite element including a speaker in addition to the piezoelectric element. As for this electronic device, in a case where a user operates the operation surface of an operation unit such as the display, tactile feedback is performed at the piezoelectric element of the composite element and sound-emitting vibration causing sound generation is performed at the speaker of the composite element. In the composite element, the piezoelectric element and the speaker are arranged in the thickness direction of the display. In such a configuration, it is difficult to reduce the size of the electronic device in the thickness direction of the operation surface of the display or the like.

An object of an aspect of the present invention is to provide a vibration device capable of generating a tactile feedback and a sound in response to a user operation a compact configuration.

Solution to Problem

A vibration device in one aspect of the present invention includes an operation unit, a plurality of piezoelectric elements, and a control unit. The operation unit has an operation surface operated by a user. The plurality of piezoelectric elements are disposed so as to overlap the operation surface when viewed from a direction orthogonal to the operation surface. The plurality of piezoelectric elements are disposed at mutually different positions in a direction along the operation surface. The control unit is arranged to control the plurality of piezoelectric elements. The control unit is arranged to vibrate the piezoelectric element corresponding to a first position on the operation surface where the operation is performed among the plurality of piezoelectric elements at a first frequency and vibrates the piezoelectric element corresponding to a second position on the operation surface different from the first position among the plurality of piezoelectric elements at a second frequency different from the first frequency, in response to the operation of the operation surface by the user. The second frequency is a frequency an audible range.

This vibration device includes the plurality of piezoelectric elements. The plurality of piezoelectric elements are disposed at mutually different positions in the direction along the operation surface. The control unit is arranged to vibrate, among the plurality of piezoelectric elements, the piezoelectric element corresponding to the first position on the operation surface where the operation by the user is performed. Further, the control unit is arranged to vibrate, among the plurality of piezoelectric elements, the piezoelectric element corresponding to the second position on the operation surface different from the first position by a frequency in the audible range. This vibration device is capable of generating a tactile feedback with respect to the user by the vibration of the piezoelectric element corresponding to the first position and is capable of generating a sound by the piezoelectric element corresponding to the second position. The tactile feedback-generating piezoelectric element and the sound-generating piezoelectric element are disposed at different positions in the direction along the operation surface. Accordingly, the size is reduced in the direction orthogonal to the operation surface.

In the above aspect, each of the piezoelectric elements niay have a resonance frequency in an audible range. According to this configuration, the sound pressure level of the sound emitted from the piezoelectric element corresponding to the second position is further improved.

In the above aspect, the first frequency at which the piezoelectric element corresponding to the first position is vibrated may be lower than the resonance frequency of the piezoelectric element. According to this configuration, the sensitivity of the tactile feedback by the user is improved, and the sound pressure level of the sound emitted from the piezoelectric element corresponding to the second position is further improved.

In the above aspect, the plurality of piezoelectric elements may include at least two piezoelectric elements having mutually different resonance frequencies. The control unit may output a signal in which at least one of a waveform of a drive signal vibrating the piezoelectric element corresponding to the first position, an intensity of the drive signal, and a frequency of the drive signal is determined based on a resonance frequency of the piezoelectric element corresponding to the first position. According to this configuration, the user can improve the sensitivity of the tactile feedback while ensuring the sound pressure level of the sound emitted from the piezoelectric element corresponding to the second position.

In the above aspect, the plurality of piezoelectric elements may include a plurality of piezoelectric elements having a first resonance frequency and a plurality of piezoelectric elements having a second resonance frequency different from the first resonance frequency. According to this configuration, even in the event of tactile vibration of any one of the plurality of piezoelectric elements, the remaining piezoelectric elements include the plurality of piezoelectric elements with mutually different resonance frequencies. Accordingly, a sound pressure level is ensured in a wider frequency band.

In the above aspect, the plurality of piezoelectric elements may include at least three piezoelectric elements each having a different resonance frequency. According to this configuration, even in the event of tactile vibration of any one of the plurality of piezoelectric elements, the remaining piezoelectric elements include the plurality of piezoelectric elements with mutually different resonance frequencies. Accordingly, a sound pressure level is ensured in a wider frequency band.

In the above aspect, the control unit may be arranged to determine, among the plurality of piezoelectric elements, the piezoelectric element corresponding to the first position, the piezoelectric element corresponding to the second position, and the piezoelectric element corresponding to a third position on the operation surface different from the first position and the second position. The control unit may be arranged not to vibrate the piezoelectric element corresponding to the third position while the piezoelectric element corresponding to the first position and the piezoelectric element corresponding to the second position are vibrated. According to this configuration, a sound is emitted from an appropriate position depending on the situation.

In the above aspect, the plurality of piezoelectric elements may be arranged in a matrix. The piezoelectric elements having the same resonance frequency may be mutually adjacent in a row direction when viewed from the direction orthogonal to the operation surface. The piezoelectric elements having mutually different resonance frequencies may be adjacent in a column direction when viewed from the direction orthogonal to the operation surface. According to this configuration, the disposition of wirings with respect to the piezoelectric element can be simplified. Accordingly, the size of the vibration device can be further reduced.

In the above aspect, the plurality of piezoelectric elements may be arranged in a matrix such that the piezoelectric elements having mutually different resonance frequencies are adjacent in a row direction and a column direction when viewed from the direction orthogonal to the operation surface. In this configuration, the piezoelectric elements with different resonance frequencies are positioned in a dispersed manner, and thus a sound with a uniform sound pressure level is emitted in each direction from the vibration device.

Advantageous Effects of Invention

An aspect of the present invention provides a vibration device capable of generating a tactile feedback and a sound in response to a user operation in a compact configuration.

DESCRIPTION OF EMBODIMENTS

Figure 1:
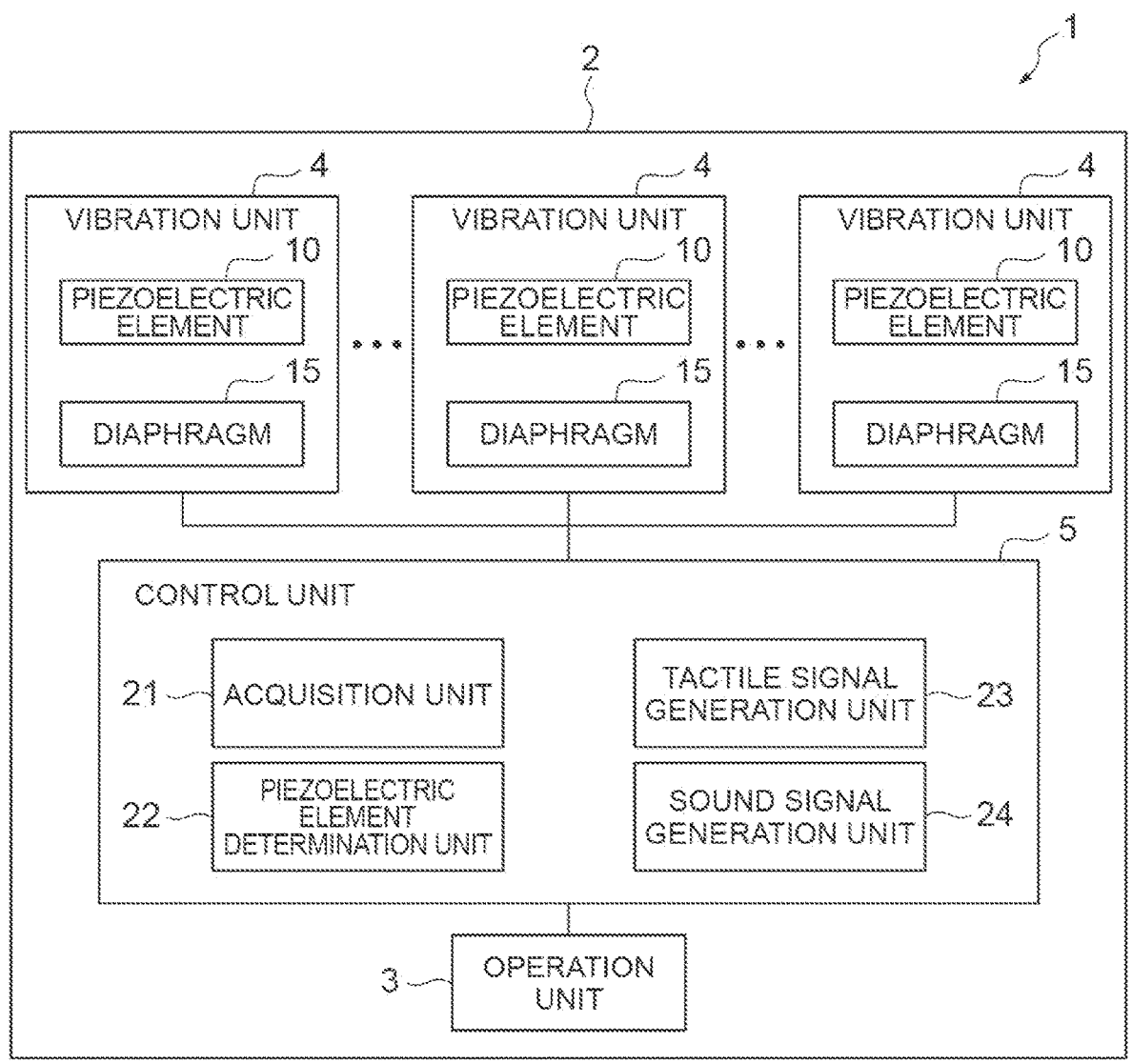
FIG. 1 is a block diagram of a vibration device in the present embodiment.

Hereinafter, an embodiment of the present invention will be described in detail with reference to the accompanying drawings. In the description of the drawings, the same reference numerals are used for the same or equivalent elements with redundant description omitted.

Figure 2:
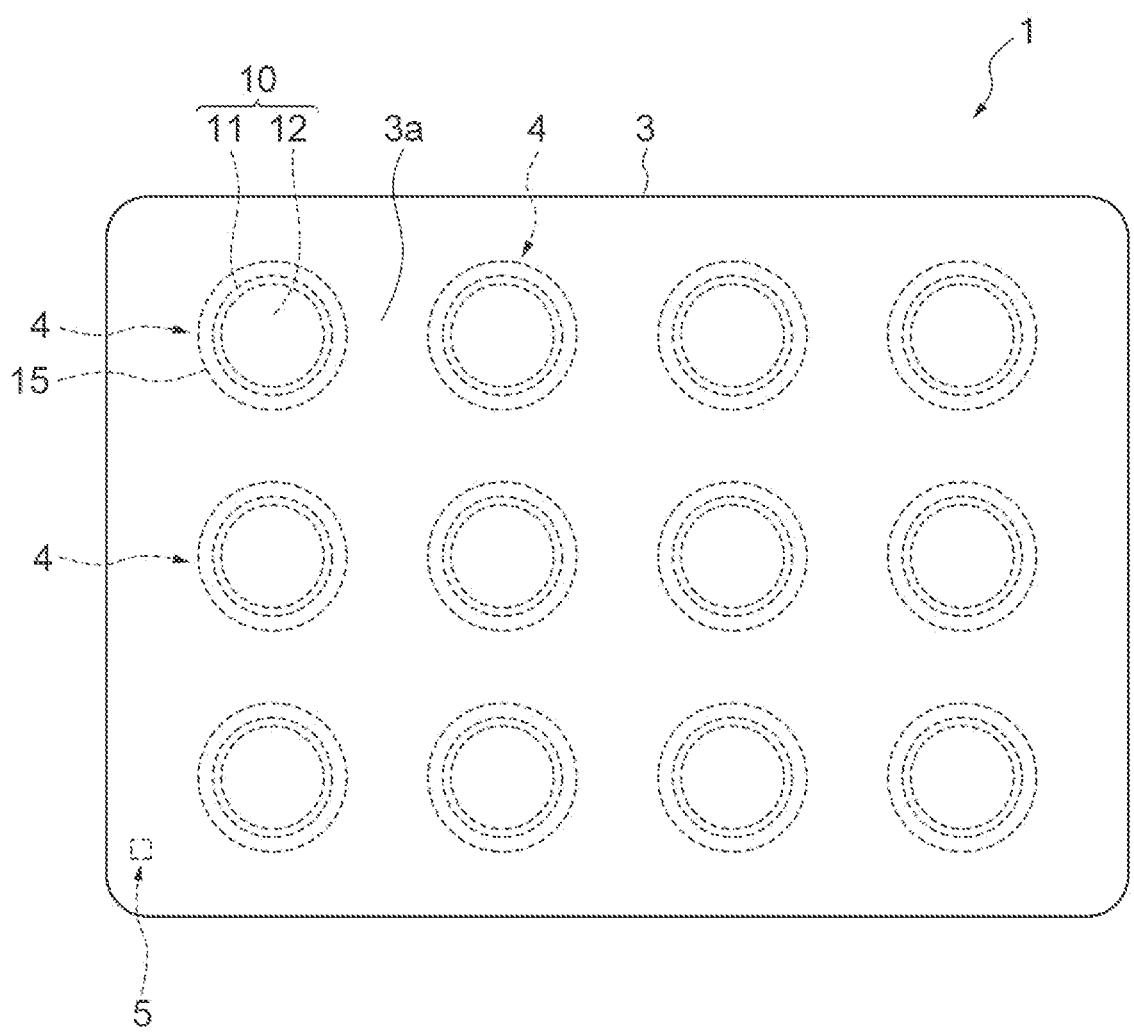
FIG. 2 is a plan view of the vibration device.
Figure 3:
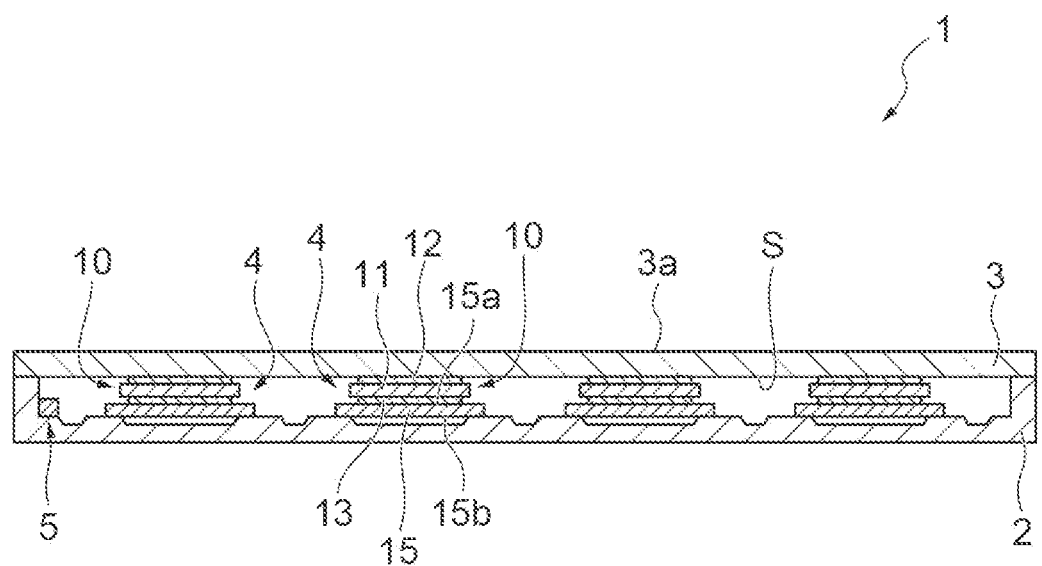
FIG. 3 is a cross-sectional view of the vibration device.

First, the configuration of a vibration device in the present embodiment will be described with reference to FIGS. 1 to 4. FIG. 1 is a block diagram of the vibration device. FIG. 2 is a plan view of the vibration device. FIG. 3 is a cross-sectional view of the vibration device.

A vibration device 1 generates a tactile feedback and a sound in response to a user operation. The vibration device 1 is used in, for example, an electronic device such as a mobile phone terminal, a smartphone, a personal computer, and a tablet terminal. The vibration device 1 includes a housing 2, an operation unit 3, a plurality of vibration units 4, and a control unit 5. The vibration device 1 may further include a display and function as a touch panel display. In this case, the operation unit 3 may be the display. The vibration device 1 may be a display-less tablet.

As illustrated in FIG. 2, the operation unit 3 is fitted in the housing 2. The vibration device 1 has an accommodation space S formed by the housing 2 and the operation unit 3. The plurality of vibration units 4 are accommodated in the accommodation space S. For example, the vibration device 1 has a plate shape, and the operation unit 3 also has a plate shape.

The operation unit 3 has an operation surface 3a operated by a user. The operation unit 3 outputs a signal corresponding to the operation of the operation surface 3a by the user to the control unit 5. The operation unit 3 outputs a signal including position information on the operation surface 3a touch-operated by the user to the control unit 5. The "operation of the operation surface" includes at least one of a case where the user operates the operation surface 3a with a part of the user's body such as a finger and a case where the user operates the operation surface 3a with an operation member such as a stylus pen. The "touch operation" includes an operation in which the user's body or the operation member applies a force to the operation surface and an operation in which the user's body or the operation member comes into contact with the operation surface and applies no force to the operation surface. The operation unit 3 includes, for example, an electrostatic touch sensor and transmits information on the position where the part of the user's body is in contact on the operation surface 3a to the control unit 5 by the above signal. The operation unit 3 may include a piezoelectric touch sensor instead of the electrostatic touch sensor.

The plurality of vibration units 4 perform tactile vibration and sound-emitting vibration in response to a drive signal from the control unit 5. The tactile vibration is vibration for performing tactile feedback. The sound-emitting vibration is vibration for emitting a sound. The plurality of vibration units 4 are disposed so as to overlap the operation surface 3a when viewed from the direction orthogonal to the operation surface 3a. The plurality of vibration units 4 are arranged along the operation surface 3a in the accommodation space S. For example, the plurality of vibration units 4 are two-dimensionally arranged in a matrix along the operation surface 3a when viewed from the direction orthogonal to the operation surface 3a. For example, the operation surface 3a has a rectangular shape, and twelve vibration units 4 are arranged in 3 rows and 4 columns. The plurality of vibration units 4 may be, for example, arranged on a straight line extending along the operation surface 3a.

Each vibration unit 4 has a piezoelectric element 10 and a diaphragm 15. The plurality of piezoelectric elements 10 are disposed so as to overlap the operation surface 3a when viewed from the direction orthogonal to the operation surface 3a. The piezoelectric element 10 is provided on the diaphragm 15. For example, one piezoelectric element 10 is joined to one diaphragm 15. The piezoelectric element 10 and the diaphragm 15 have, for example, a circular shape when viewed from the direction orthogonal to the operation surface 3a. The diaphragm 15 is, for example, larger than the piezoelectric element 10 in a plan view. When viewed from the direction orthogonal to the operation surface 3a, the edge of the diaphragm 15 surrounds, for example, the edge of the piezoelectric element 10 joined to the diaphragm 15.

The piezoelectric element 10 is displaced in response to a drive signal from the control unit 5. The direction in which each piezoelectric element 10 is displaced by the drive signal from the control unit 5 includes a component in the direction orthogonal to the operation surface 3a. In other words, each piezoelectric element 10 is displaced in the thickness direction of the vibration device 1. The piezoelectric element 10 repeats the displacement in accordance with the frequency of the drive signal. The force transmitted from the piezoelectric element 10 vibrates the diaphragm 15.

In the vibration device 1, each vibration unit 4 includes one piezoelectric element 10. Accordingly, in the vibration device 1, the plurality of piezoelectric elements 10 are arranged along the operation surface 3a in the accommodation space S. In other words, the plurality of piezoelectric elements 10 are disposed at mutually different positions in the direction along the operation surface 3a. For example, the plurality of piezoelectric elements 10 are two-dimensionally arranged in a matrix along the operation surface 3a when viewed from the direction orthogonal to the operation surface 3a.

Each piezoelectric element 10 has a resonance frequency in the audible range. The resonance frequency of the plurality of piezoelectric elements 10 is 20 Hz to 20,000 Hz. For example, each piezoelectric element 10 is configured to have a resonance frequency of 3,000 Hz to 10,000 Hz. The plurality of piezoelectric elements 10 are divided into, for example, a plurality of groups with mutually different resonance frequencies. In other words, the plurality of piezoelectric elements 10 include at least two piezoelectric elements 10 with mutually different resonance frequencies.

The piezoelectric element 10 has a piezoelectric element body 11 and a pair of external electrodes 12 and 13. The piezoelectric element body 11 is configured by stacking a plurality of piezoelectric body layers (not illustrated). Each piezoelectric body layer is made of a piezoelectric material. For example, each piezoelectric body layer is made of a piezoelectric ceramic material. Used as the piezoelectric ceramic material is, for example, PZT [Pb (Zr, Ti) O$_3$], PT (PbTiO$_3$), PLZT [(Pb, La) (Zr, Ti) O$_3$], or barium titanate (BaTiO$_3$). Each piezoelectric body layer is configured from, for example, a sintered body of a ceramic green sheet containing the above piezoelectric ceramic material. In the actual piezoelectric element body 11, the plurality of piezoelectric body layers are integrated to the extent that the boundaries between the respective piezoelectric body layers cannot be recognized. A plurality of internal electrodes (not illustrated) are disposed in the piezoelectric element body 11. Each internal electrode is made of a conductive material. Used as the conductive material is, for example, Ag, Pd, or an Ag—Pd alloy.

The diaphragm 15 is disposed between the housing 2 and the piezoelectric element 10 corresponding to the diaphragm 15. The diaphragm 15 has a pair of main surfaces 15a and 15b. The diaphragm 15 is joined to the piezoelectric element 10 corresponding to the diaphragm 15, on the main surface 15a. The diaphragm 15 is supported by the housing 2 on the main surface 15b. A part of the main surface 15b of the diaphragm 15 is separated from the housing 2. The diaphragm 15 is joined to the housing 2 in the edge portion of the diaphragm 15. The middle of the diaphragm 15 is separated from the housing 2. The material of the diaphragm 15 includes, for example, at least one of brass, stainless steel, and a nickel alloy.

The control unit 5 is, for example, one or a plurality of computers configured by hardware and software such as a program. The control unit 5 includes, for example, a processor and a storage device as hardware. The processor executes an operating system, an application program, and the like. The storage device is configured by a read only memory (ROM) and a random access memory (RAM).

Figure 4:
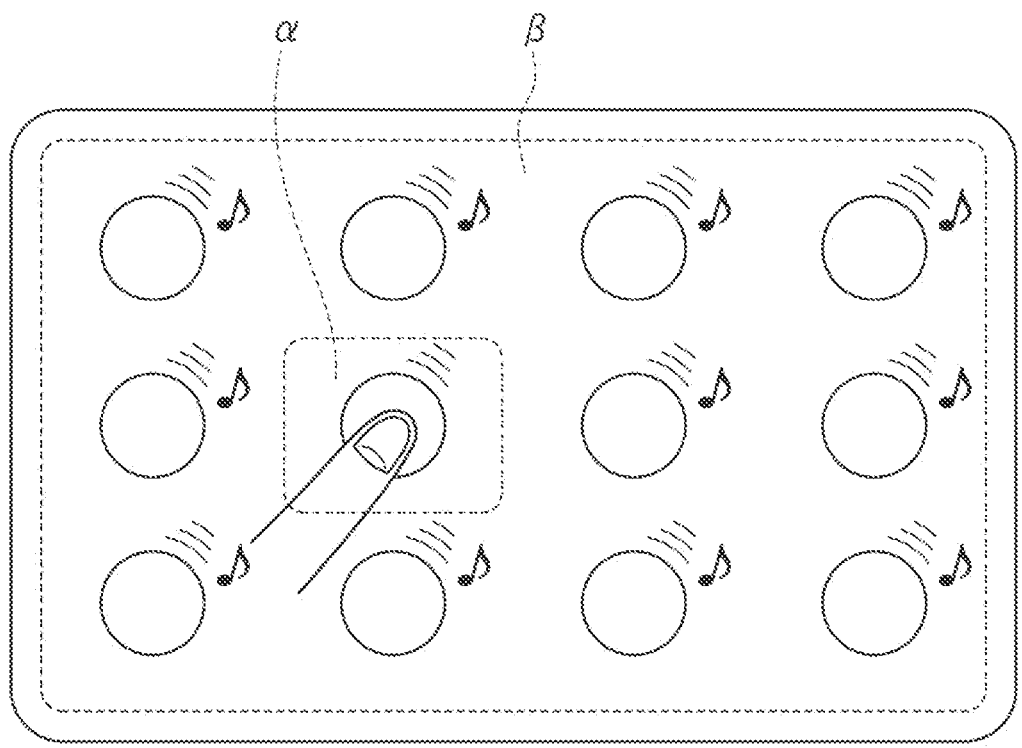
FIG. 4 is a diagram for describing the control of a piezoelectric element by a control unit.

The control unit 5 controls the piezoelectric element 10 of each vibration unit 4 in response to the operation of the operation surface 3a by a user. For example, the control unit 5 controls the plurality of vibration units 4 based on a signal output from the operation unit 3. For example, the control unit 5 outputs a drive signal and controls the plurality of piezoelectric elements 10 by the drive signal. FIG. 4 is a diagram for describing the control of the piezoelectric element 10 by the control unit 5.

As illustrated in FIG. 4, in response to the operation of the operation surface 3a by a user U, the control unit 5 tactilely vibrates the piezoelectric element 10 corresponding to a first position α where the operation is performed. In response to the operation of the operation surface 3a by the user U, the control unit 5 causes the piezoelectric element 10 corresponding to a second position β to perform sound-emitting vibration. The second position β is different from the first position α where the operation is performed. Each of the first position α and the second position β is a position on the operation surface 3a. The first position α is a position on the operation surface 3a where the touch operation is performed by the user U, and the second position β is a position on the operation surface 3a where no touch operation is performed by the user U.

For example, the piezoelectric element 10 corresponding to the first position α is the piezoelectric element 10 disposed at a position overlapping the first position α when viewed from the direction orthogonal to the operation surface 3a. The piezoelectric element 10 corresponding to the second position β is the piezoelectric element 10 disposed at a position overlapping the second position β when viewed from the direction orthogonal to the operation surface 3a. The piezoelectric element 10 corresponding to the first position α is one piezoelectric element 10, and the piezoelectric element 10 corresponding to the second position β is each of two or more piezoelectric elements 10. For example, in response to the operation of the operation surface 3a by the user U, the control unit 5 tactilely vibrates the piezoelectric element 10 positioned directly below the position on the operation surface 3a touch-operated by the user U and causes the plurality of piezoelectric elements 10 to perform sound-emitting vibration. For example, the control unit 5 outputs a drive signal such that the plurality of piezoelectric elements 10 performing sound-emitting vibration play a melody by a change in vibration frequency. The control unit 5 may output a drive signal such that the plurality of piezoelectric elements 10 performing sound-emitting vibration generate a single sound.

The control unit 5 outputs a drive signal to the piezoelectric element 10 corresponding to the first position α so as to vibrate at a first frequency. The control unit 5 outputs a drive signal to the piezoelectric element 10 corresponding to the second position β so as to vibrate at a second frequency. The first frequency at which the piezoelectric element 10 corresponding to the first position α is vibrated is lower than the resonance frequency of the piezoelectric element 10. The first frequency is smaller than the second frequency. At least the second frequency is a frequency in the audible range. The first frequency is, for example, 50 Hz to 200 Hz. For example, the first frequency is 160 Hz. The second frequency is, for example, 20 Hz to 20,000 Hz. The second frequency is, for example, 3,000 Hz to 10,000 Hz and varies depending on the pitch of the sound emitted by the piezoelectric element 10.

The control unit 5 may be accommodated in the accommodation space S or may be provided outside the accommodation space S. The control unit 5 may be separated from the housing 2 and the operation unit 3. The control unit 5 has an acquisition unit 21, a piezoelectric element determination unit 22, a tactile signal generation unit 23, and a sound signal generation unit 24.

The acquisition unit 21 acquires a signal corresponding to the operation of the operation surface 3a by the user U. The signal includes position information on the operation surface 3a touch-operated by the user U, For example, the acquisition unit 21 acquires a signal output from the operation unit 3.

The piezoelectric element determination unit 22 selects the piezoelectric element 10 to be operated in accordance with the signal acquired by the acquisition unit 21. In other words, the piezoelectric element determination unit 22 determines the piezoelectric element 10 corresponding to the first position α and the piezoelectric element 10 corresponding to the second position α in accordance with the signal acquired by the acquisition unit 21.

The tactile signal generation unit 23 generates a drive signal tactilely vibrating the piezoelectric element 10. The tactile signal generation unit 23 outputs the generated drive signal to the piezoelectric element 10 determined by the piezoelectric element determination unit 22 and corresponding to the first position α. In other words, the tactile signal generation unit 23 generates a drive signal vibrating the piezoelectric element 10 at the first frequency and outputs the drive signal to the piezoelectric element 10 corresponding to the first position α. For example, the tactile signal generation unit 23 acquires the resonance frequency of the piezoelectric element 10 corresponding to the first position α. The tactile signal generation unit 23 determines at least one of the waveform of the drive signal tactilely vibrating the piezoelectric element 10, the intensity of the drive signal, and the frequency of the drive signal in accordance with the acquired resonance frequency.

As a modification example of the present embodiment, the tactile signal generation unit 23 may read out a drive signal determined based on the resonance frequency of the piezoelectric element 10 corresponding to the first position α from a storage unit and output the drive signal. In this case, the drive signal may be, for example, stored in the storage unit with at least one of the waveform, intensity, and frequency of the drive signal and the resonance frequency associated in advance. The tactile signal generation unit 23 may acquire the drive signal determined based on the resonance frequency of the piezoelectric element 10 corresponding to the first position α from a device outside the vibration device and output the drive signal.

Figure 5:
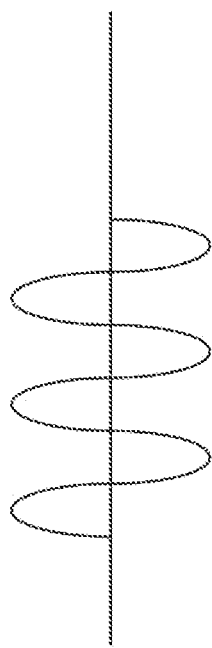
FIGS. 5A to 5D are diagrams for describing a drive signal driving the piezoelectric element.
Figure 5:
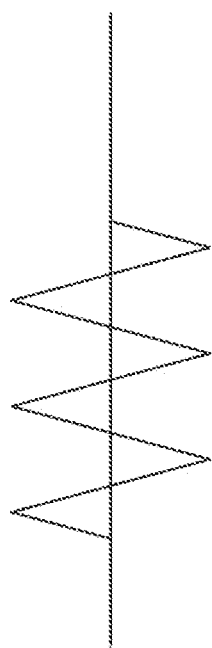
Figure 5:
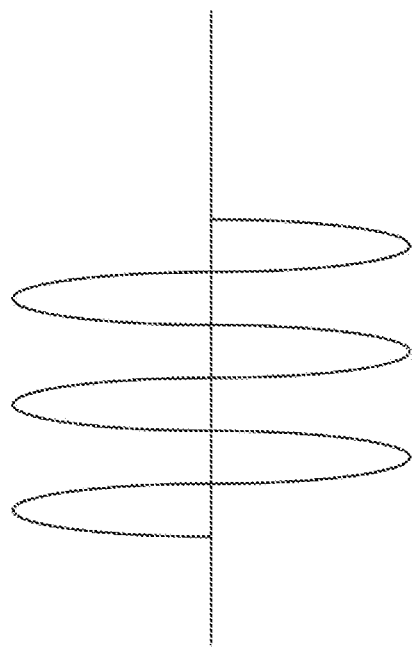
Figure 5:
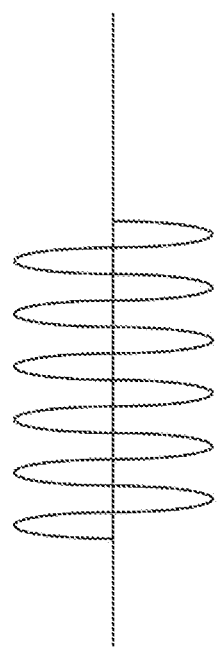

FIGS. 5A to 5D illustrate an example of the drive signal tactilely vibrating the piezoelectric element 10. FIG. 5A illustrates an example of the waveform of a reference drive signal. FIG. 5B illustrates an example of a drive signal changed in waveform from the reference drive signal. The waveform of the drive signal illustrated in FIG. 5A is closer to a sine wave than the waveform of the drive signal illustrated in FIG. 5B whereas the drive signal illustrated in FIG. 5B has the waveform of a triangular wave. FIG. 5C illustrates an example of a drive signal changed in intensity from the reference drive signal. The intensity of the drive signal illustrated in FIG. 5C is higher than the intensity of the drive signal illustrated in FIG. 5A. FIG. 5D illustrates an example of a drive signal changed in frequency from the reference drive signal. The frequency of the drive signal illustrated in FIG. 5D is higher than the frequency of the drive signal illustrated in FIG. 5A.

The sound signal generation unit 24 generates a drive signal causing the piezoelectric element 10 to perform sound-emitting vibration. The sound signal generation unit 24 outputs the generated drive signal to the piezoelectric element 10 determined by the piezoelectric element determination unit 22 and corresponding to the second position β. In other words, the tactile signal generation unit 23 generates a drive signal vibrating the piezoelectric element 10 at the second frequency and outputs the drive signal to the piezoelectric element 10 corresponding to the second position β.

Figure 6:
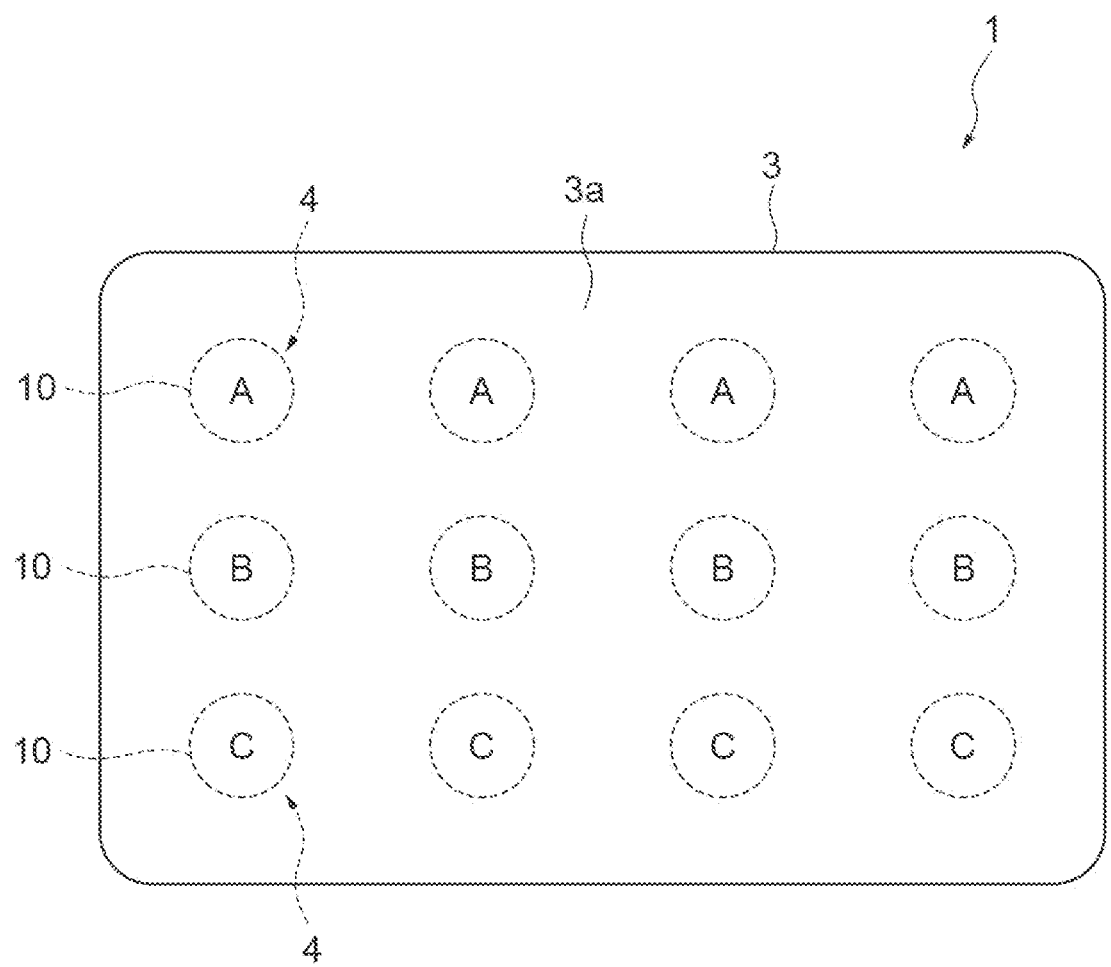
FIG. 6 is a diagram for describing the disposition of the piezoelectric element.
Figure 7:
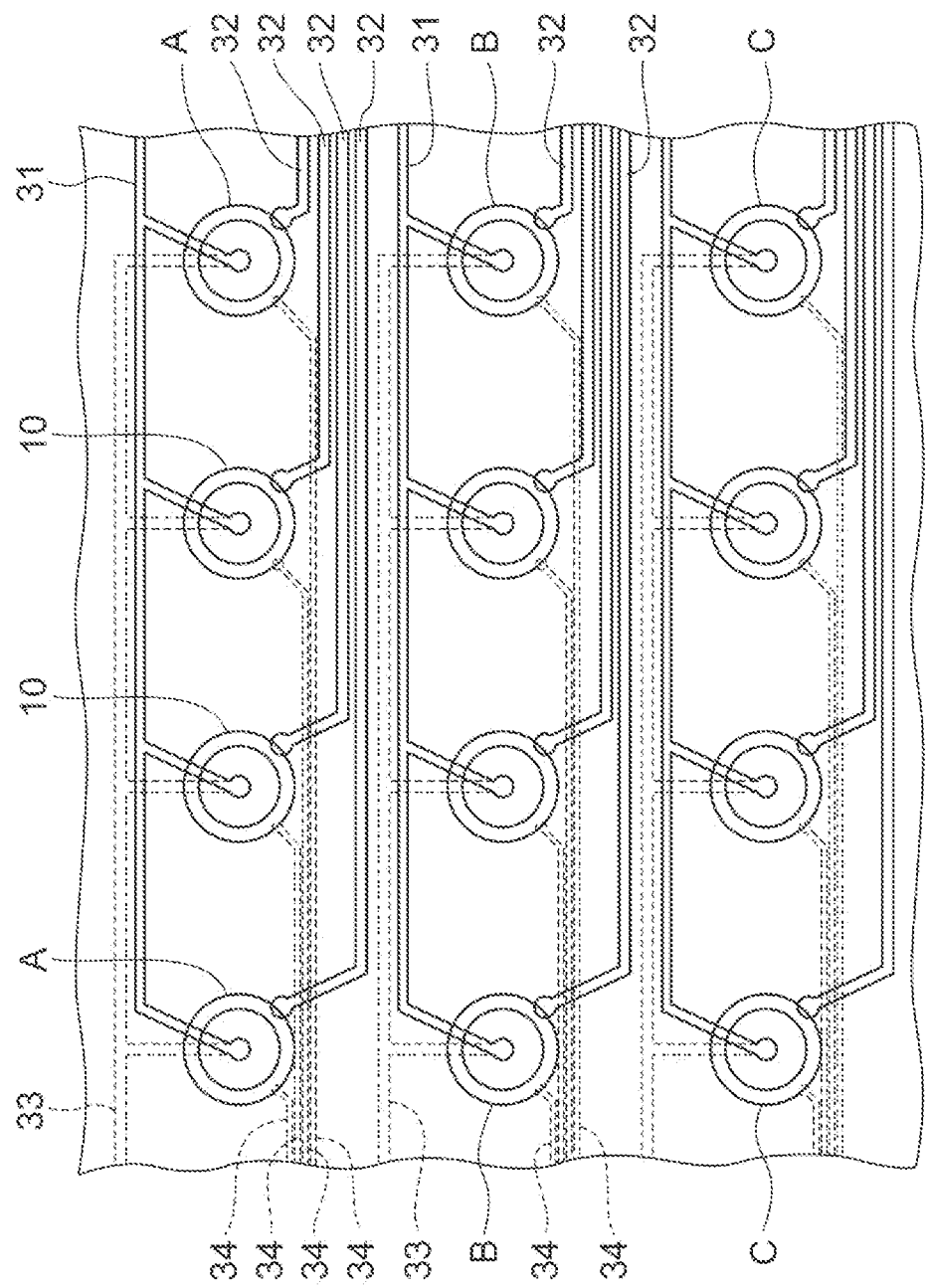
FIG. 7 is a diagram for describing wiring with respect to the piezoelectric element.

Next, an example of the configuration of the piezoelectric elements 10 in the vibration device 1 will be described in detail with reference to FIGS. 6 and 7. FIG. 6 illustrates the disposition of the piezoelectric elements 10 as viewed from the direction orthogonal to the operation surface 3a. FIG. 7 illustrates a part of wiring with respect to the piezoelectric elements 10 in the present embodiment.

In the vibration device 1 illustrated in FIG. 6, the plurality of piezoelectric elements 10 include three groups of piezoelectric elements 10. The three groups of piezoelectric elements 10 have mutually different resonance frequencies. In other words, the plurality of piezoelectric elements 10 include at least three piezoelectric elements 10 each having a different resonance frequency. The plurality of piezoelectric elements 10 include a plurality of piezoelectric elements A with a first resonance frequency, a plurality of piezoelectric elements B with a second resonance frequency, and a plurality of piezoelectric elements C with a third resonance frequency.

In the vibration device 1 illustrated in FIG. 6, the plurality of piezoelectric elements 10 are arranged in a matrix of 3 rows and 4 columns. The piezoelectric elements with the same resonance frequency are arranged so as to be mutually adjacent in the row direction when viewed from the direction orthogonal to the operation surface 3a. The piezoelectric elements with mutually different resonance frequencies are arranged so as to be mutually adjacent in the column direction when viewed from the direction orthogonal to the operation surface 3a.

For example, the plurality of piezoelectric elements A are arranged in the row direction so as to be mutually adjacent without sandwiching the piezoelectric element B and the piezoelectric element C. The plurality of piezoelectric elements B are arranged in the row direction so as to be mutually adjacent without sandwiching the piezoelectric element A and the piezoelectric element C. The plurality of piezoelectric elements C are arranged in the row direction so as to be mutually adjacent without sandwiching the piezoelectric element A and the piezoelectric element B. The row in which the plurality of piezoelectric elements B are arranged is positioned so as to be adjacent to the row in which the plurality of piezoelectric elements A are arranged. The row in which the plurality of piezoelectric elements C are arranged is positioned so as to be adjacent to the row in which the plurality of piezoelectric elements B are arranged. The plurality of piezoelectric elements 10 are arranged in the order of the piezoelectric element A, the piezoelectric element B, and the piezoelectric element C in the column direction.

FIG. 7 illustrates a wiring structure with respect to the piezoelectric elements 10 in the vibration device 1 illustrated in FIG. 6. FIG. 7 illustrates the vibration device 1 excluding the operation unit 3. A pair of wirings 31 and 32 and a pair of wirings 33 and 34 are connected to each piezoelectric element 10. The pair of wirings 31 and 32 transmit a drive signal tactilely vibrating the piezoelectric element 10. The pair of wirings 33 and 34 transmit a signal causing the piezoelectric element 10 to perform sound-emitting vibration. The plurality of piezoelectric elements 10 with the same resonance frequency are connected in parallel by the same wirings 31 and 33. The wirings 31, 32, 33, and 34 connected to the plurality of piezoelectric elements 10 with the same resonance frequency extend in the row direction between the adjacent piezoelectric elements 10 and the wirings 31, 32, 33, and 34.

The wirings 32 and 34 connected to the plurality of piezoelectric elements A extend in the row direction between the group of the plurality of piezoelectric elements A and the group of the plurality of piezoelectric elements B. The wirings 31 and 33 connected to the plurality of piezoelectric elements B extend in the row direction between the group of the plurality of piezoelectric elements A and the group of the plurality of piezoelectric elements B. The wirings 32 and 34 connected to the plurality of piezoelectric elements B extend in the row direction between the group of the plurality of piezoelectric elements B and the group of the plurality of piezoelectric elements C. The mutually different wirings 31, 32, 33, and 34 are disposed so as not to mutually overlap when viewed from the direction orthogonal to the operation surface 3a. The direction in which the wirings 31 and 32 extend from each piezoelectric element 10 is opposite to the direction in which the wirings 33 and 34 extend from each piezoelectric element 10.

Figure 8:
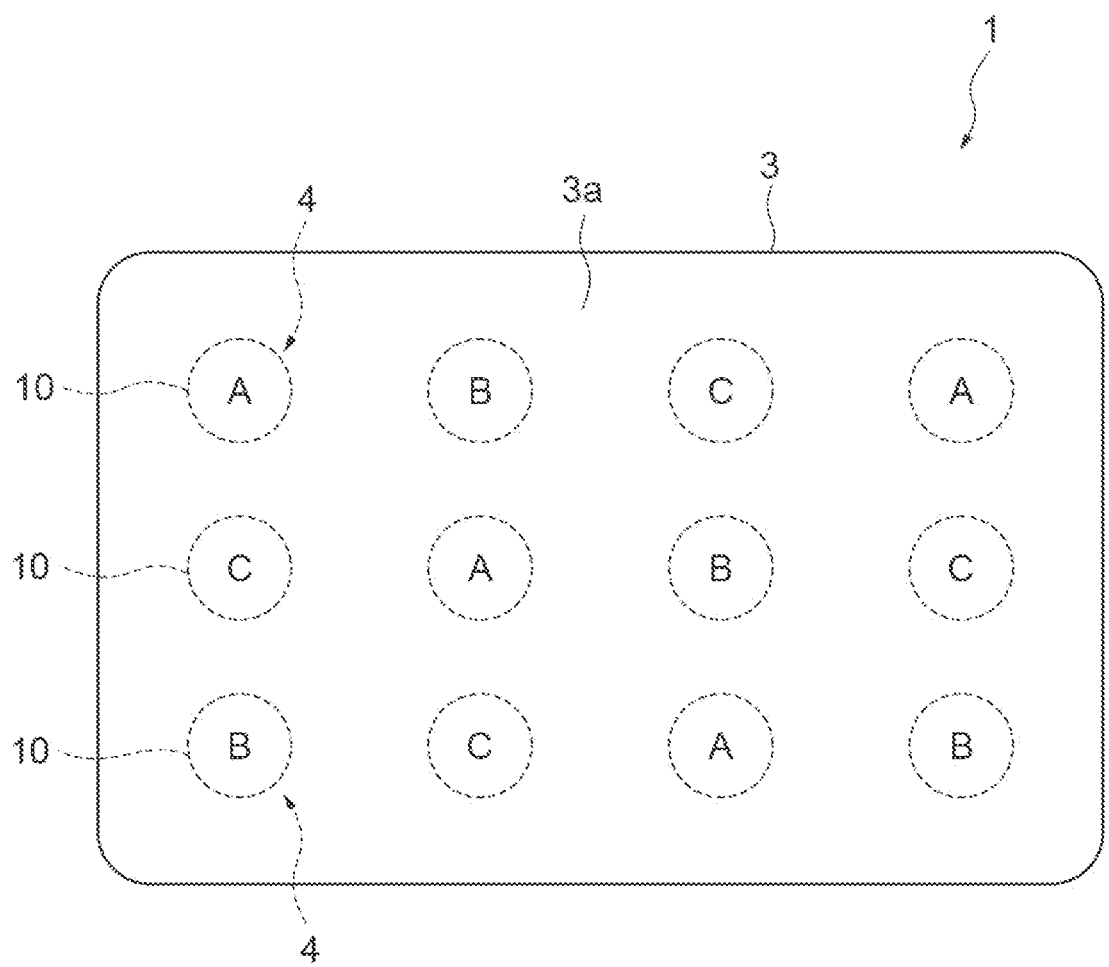
FIG. 8 is a diagram for describing the disposition of a piezoelectric element in a modification example of the present embodiment.

As a modification example of the present embodiment, the plurality of piezoelectric elements 10 may be arranged such that the piezoelectric elements with the same resonance frequency are dispersed. FIG. 8 illustrates the disposition of the piezoelectric elements 10 as viewed from the direction orthogonal to the operation surface 3a in the modification example of the present embodiment. When viewed from the direction orthogonal to the operation surface 3a in the vibration device 1 illustrated in FIG. 8, the plurality of piezoelectric elements 10 are arranged in a matrix such that the piezoelectric elements with mutually different resonance frequencies are mutually adjacent in the row direction and the column direction. In the vibration device 1 illustrated in FIG. 8, the row in which the piezoelectric elements 10 are arranged in the row direction in the order of the piezoelectric element C, the piezoelectric element A, the piezoelectric element B, and the piezoelectric element C is positioned next to the row in which the piezoelectric elements 10 are arranged in the row direction in the order of the piezoelectric element A, the piezoelectric element B, the piezoelectric element C, and the piezoelectric element A. The row in which the piezoelectric elements 10 are arranged in the row direction in the order of the piezoelectric element B, the piezoelectric element C, the piezoelectric element A, and the piezoelectric element B is positioned next to the row in which the piezoelectric elements 10 are arranged in the row direction in the order of the piezoelectric element C, the piezoelectric element A, the piezoelectric element B, and the piezoelectric element C.

Figure 9:
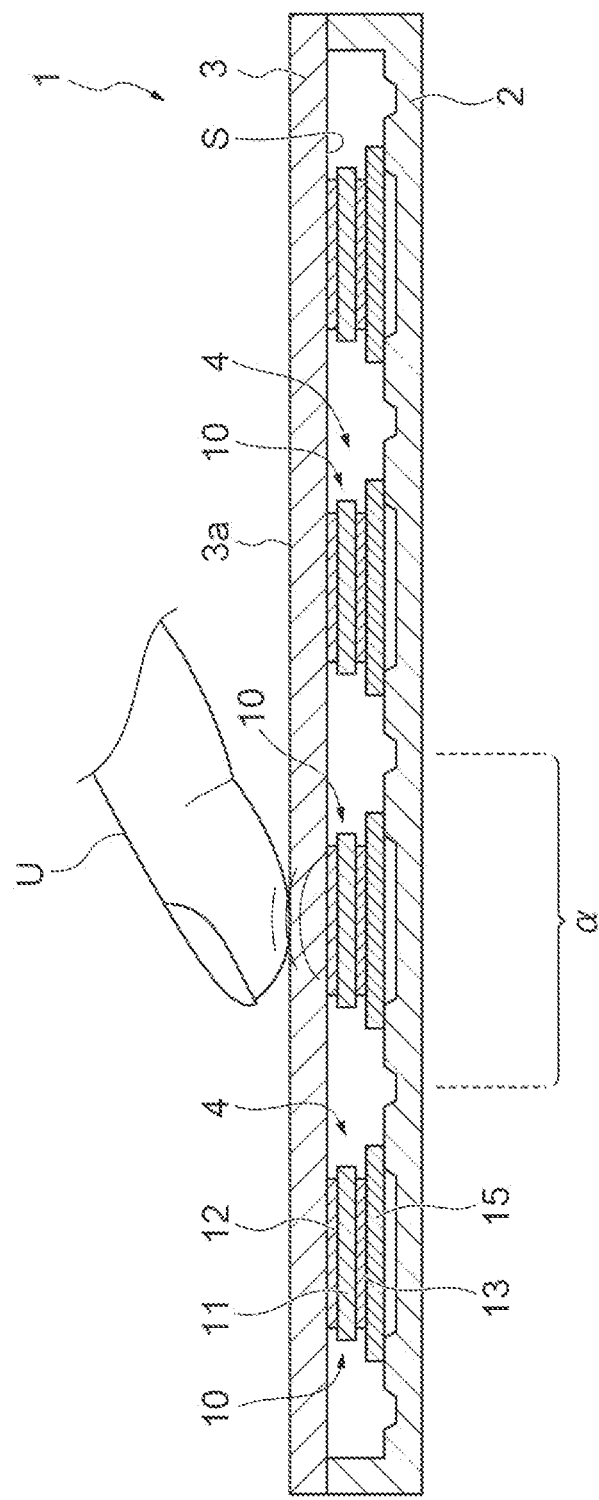
FIG. 9 is a diagram for describing the operation of the vibration device.
Figure 10:
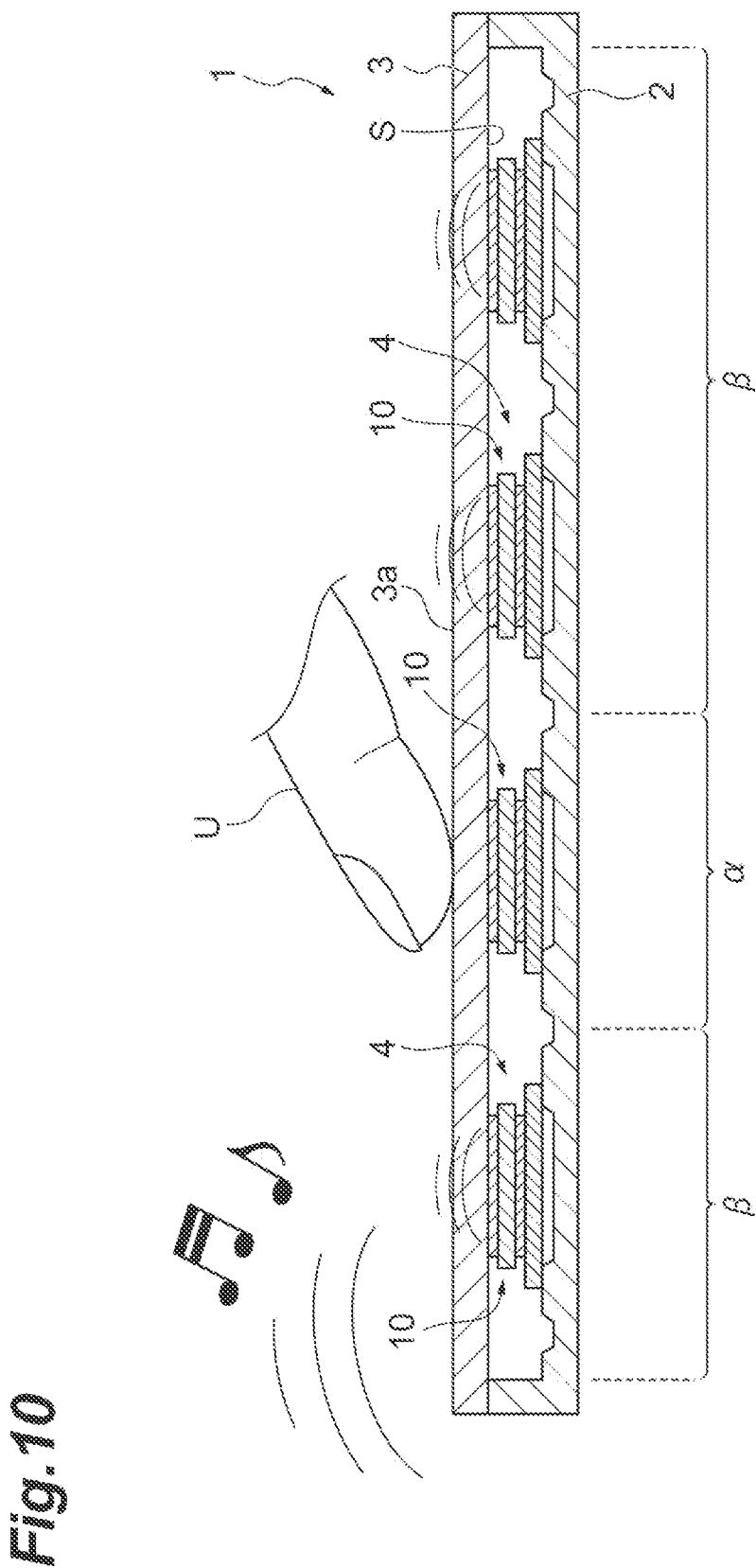
FIG. 10 is a diagram for describing the operation of the vibration device.
Figure 11:
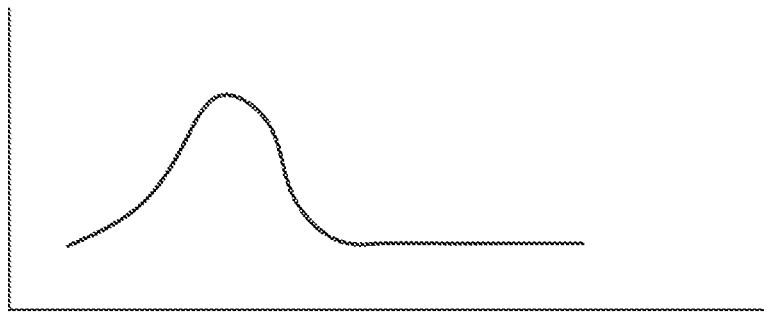
FIGS. 11A to 11D are diagrams for describing the resonance frequency of the piezoelectric element.
Figure 11:
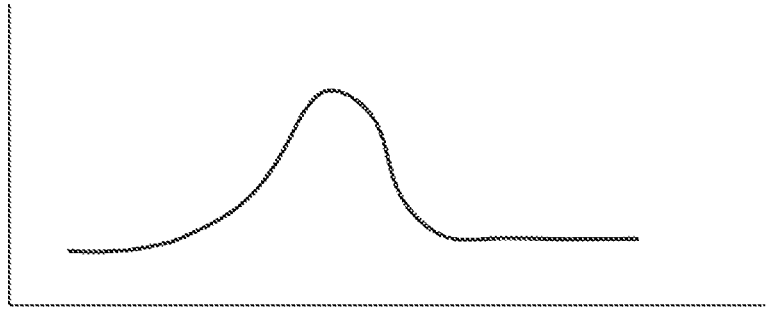
Figure 11:
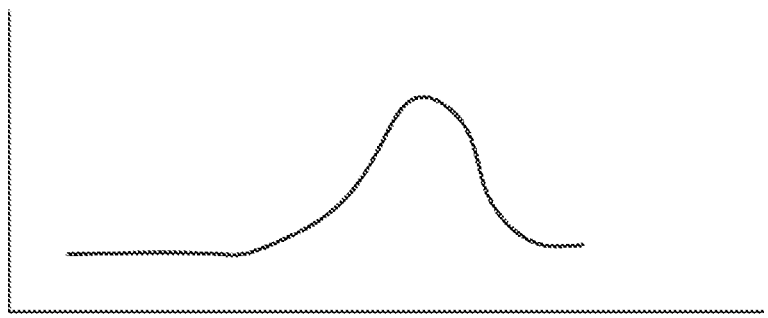
Figure 11:
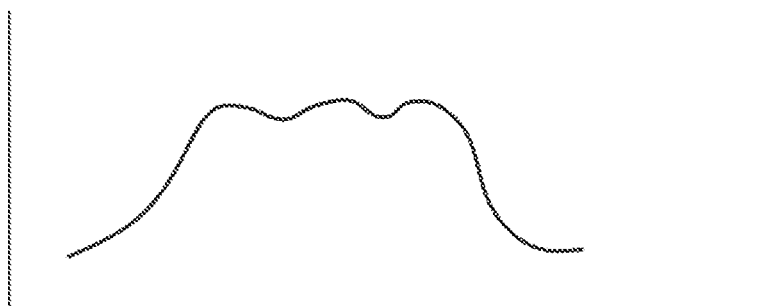
Figure 12:
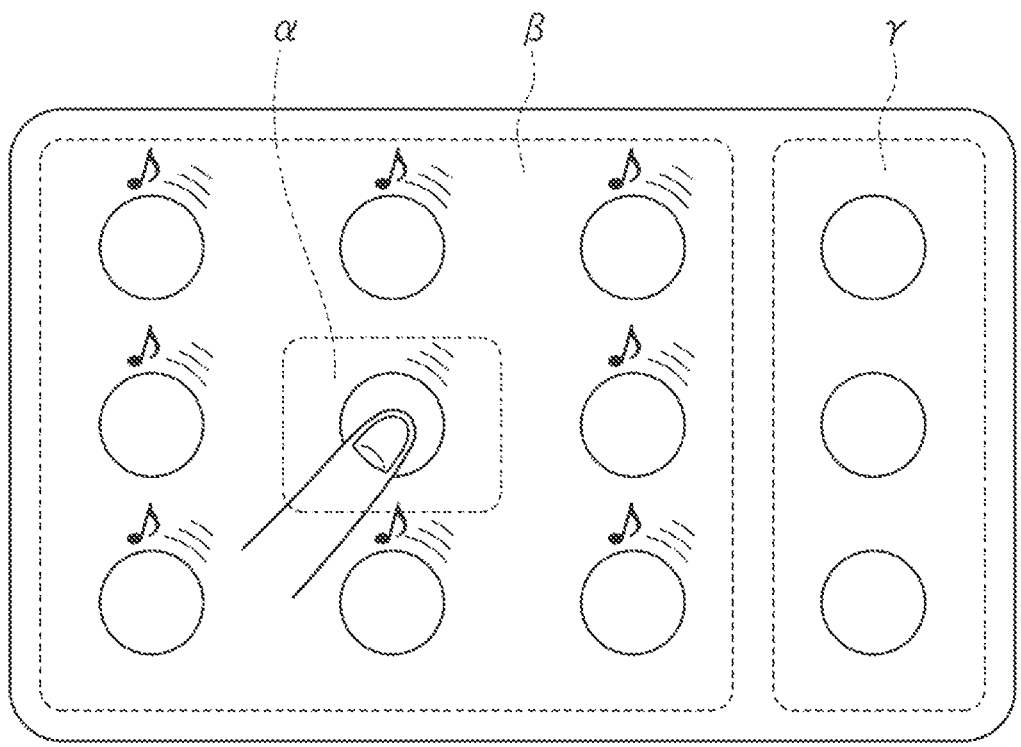
FIG. 12 is a diagram for describing the position of an operating piezoelectric element in a vibration device in a modification example of the present embodiment.

Next, the operation of the vibration device 1 will be described with reference to FIGS. 4 and 9 to 12. FIGS. 9 and 10 are diagrams for describing the operation of the vibration device. FIGS. 11A to 11D illustrate piezoelectric element frequency characteristics. FIG. 12 is a diagram for describing the position of an operating piezoelectric element.

As illustrated in FIG. 9, in the vibration device 1, when the operation surface 3a of the operation unit 3 is operated by the user U, the piezoelectric element 10 positioned directly below the position on the operation surface 3a operated by the user U vibrates tactilely. The tactile vibration of the piezoelectric element 10 is transmitted to the user U via the operation unit 3. As a result, the user U receives a tactile feedback corresponding to the operation of the operation unit 3.

As illustrated in FIG. 10, in the vibration device 1, when the operation surface 3a of the operation unit 3 is operated by the user U, the piezoelectric element 10 that is different from the tactilely vibrated piezoelectric element 10 performs sound-emitting vibration. For example, a melody is emitted from the operation surface 3a by the plurality of piezoelectric elements 10 performing sound-emitting vibration. The plurality of piezoelectric elements 10 performing sound-emitting vibration include the piezoelectric elements A, B, and C with mutually different resonance frequencies.

FIG. 11A illustrates the frequency characteristics of the piezoelectric element A. FIG. 11B illustrates the frequency characteristics of the piezoelectric element B. FIG. 11C illustrates the frequency characteristics of the piezoelectric element C. As illustrated in FIGS. 11A to 11C, the frequency characteristics of the piezoelectric elements A, B, and C have peaks at mutually different frequencies. Accordingly, a waveform as illustrated in FIG. 11D can be obtained when the frequency characteristics of the piezoelectric elements A, B, and C are synthesized. This synthesized waveform is larger in peak width than the waveform of the frequency characteristics of each of the piezoelectric elements A, B, and C. Accordingly, by the control unit 5 causing the piezoelectric elements A, B, and C to perform sound-emitting vibration simultaneously, a sound pressure level is ensured in a wider frequency band than when the piezoelectric elements A, B, and C are caused to perform sound-emitting vibration respectively.

For example, as illustrated in FIG. 4, the piezoelectric element determination unit 22 of the control unit 5 determines the piezoelectric element 10 disposed at the position overlapping the first position α where the operation by the user U is performed when viewed from the direction orthogonal to the operation surface 3a as the piezoelectric element 10 corresponding to the first position α. Of the plurality of piezoelectric elements 10 included in the vibration device 1, every piezoelectric element 10 except the piezoelectric element 10 corresponding to the first position α is determined by the piezoelectric element determination unit 22 as the piezoelectric element 10 corresponding to the second position β. In other words, the second position β the entire region on the operation surface 3a except the first position α.

As a modification example of the present embodiment, the control unit 5 may not vibrate some of the plurality of piezoelectric elements 10 included in the vibration device 1. For example, as illustrated in FIG. 12, the control unit 5 tactilely vibrates the piezoelectric element 10 corresponding to the first position α, causes the piezoelectric element 10 corresponding to the second position β to perform sound-emitting vibration, and does not vibrate the piezoelectric element 10 corresponding to a third position γ different from the first position α and the second position β on the operation surface 3a. The control unit 5 does not vibrate the piezoelectric element 10 corresponding to the third position γ while the piezoelectric element 10 corresponding to the first position α and the piezoelectric element 10 corresponding to the second position β are vibrated. For example, the control unit 5 prohibits the vibration of the piezoelectric element 10 corresponding to the third position γ until the position operated by the user U is changed.

In this modification example, the second position β is a position associated in advance with the first position α. For example, in the vibration device 1, information on the relative position of the second position β with respect to the first position α is stored in advance in a memory (not illustrated). When the piezoelectric element 10 corresponding to the first position α is determined, the piezoelectric element determination unit 22 of the control unit 5 acquires the relative position information and determines the piezoelectric element 10 corresponding to the second position β based on the relative position information and the determined first position α or the piezoelectric element 10 corresponding to the first position α.

For example, the piezoelectric element determination unit 22 of the control unit 5 determines the piezoelectric element 10 disposed at the position overlapping the first position α where the operation by the user U is performed when viewed from the direction orthogonal to the operation surface 3a as the piezoelectric element 10 corresponding to the first position α. Of the plurality of piezoelectric elements 10 included in the vibration device 1, for example, the piezoelectric element 10 adjacent in four or eight directions to the piezoelectric element 10 corresponding to the first position α when viewed from the direction orthogonal to the operation surface 3a is determined by the piezoelectric element determination unit 22 as the piezoelectric element 10 corresponding to the second position β. The "four directions" means the vertical and horizontal directions on the operation surface 3a. The "eight directions" means the vertical, horizontal, and diagonal directions on the operation surface 3a. Of the plurality of piezoelectric elements 10 included in the vibration device 1, every piezoelectric element 10 except the piezoelectric element 10 corresponding to the first position α and the piezoelectric element 10 corresponding to the second position β is determined by the piezoelectric element determination unit 22 as the piezoelectric element 10 corresponding to the third position γ.

As described above, the vibration device 1 includes the plurality of piezoelectric elements 10. The plurality of piezoelectric elements 10 are disposed at mutually different positions in the direction along the operation surface 3a. The control unit 5 vibrates, among the plurality of piezoelectric elements 10, the piezoelectric element 10 corresponding to the first position α on the operation surface 3a where the operation by the user U is performed. Further, the control unit 5 vibrates, among the plurality of piezoelectric elements 10, the piezoelectric element 10 corresponding to the second position β on the operation surface 3a different from the first position α by a frequency in the audible range. The vibration device 1 is capable of generating a tactile feedback with respect to the user U by the vibration of the piezoelectric element 10 corresponding to the first position α and is capable of generating a sound by the piezoelectric element 10 corresponding to the second position β. The tactile feedback-generating piezoelectric element 10 and the sound-generating piezoelectric element 10 are disposed at different positions in the direction along the operation surface 3a. Accordingly, the size is reduced in the direction orthogonal to the operation surface 3a.

The plurality of piezoelectric elements 10 are disposed so as to overlap the operation surface 3a when viewed from the direction orthogonal to the operation surface 3a. Accordingly, the user U can feel as if a sound is being emitted from the operation surface 3a. In other words, the vibration device 1 is capable of giving a tactile feedback and a sense of presence by sound to the user U in a compact configuration.

Each piezoelectric element 10 has a resonance frequency in the audible range. According to this configuration, the sound pressure level of the sound emitted from the piezoelectric element 10 corresponding to the second position β is further improved.

The first frequency at which the piezoelectric element 10 corresponding to the first position α is vibrated is lower than the resonance frequency of the piezoelectric element 10. According to this configuration, the sensitivity of the tactile feedback by the user U is improved, and the sound pressure level of the sound emitted from the piezoelectric element 10 corresponding to the second position β is further improved.

The plurality of piezoelectric elements 10 include at least two piezoelectric elements 10 having mutually different resonance frequencies. The control unit 5 outputs a signal in which at least one of the waveform of the drive signal vibrating the piezoelectric element 10 corresponding to the first position α, the intensity of the drive signal, and the frequency of the drive signal is determined based on the resonance frequency of the piezoelectric element 10 corresponding to the first position α. According to this configuration, the user U can improve the sensitivity of the tactile feedback while ensuring the sound pressure level of the sound emitted from the piezoelectric element 10 corresponding to the second position γ.

The plurality of piezoelectric elements 10 include the plurality of piezoelectric elements 10 having the first resonance frequency and the plurality of piezoelectric elements 10 having the second resonance frequency different from the first resonance frequency. According to this configuration, even in the event of tactile vibration of any one of the plurality of piezoelectric elements 10, the remaining piezoelectric elements 10 include the plurality of piezoelectric elements 10 with mutually different resonance frequencies. Accordingly, a sound pressure level is ensured in a wider frequency band. Accordingly, the vibration device 1 is capable of ensuring the sound pressure level of each pitch and emitting a melody from the piezoelectric element 10 corresponding to the second position β.

The plurality of piezoelectric elements 10 include at least three piezoelectric elements 10 each having a different resonance frequency. According to this configuration, even in the event of tactile vibration of any one of the plurality of piezoelectric elements 10, the remaining piezoelectric elements 10 include the plurality of piezoelectric elements 10 with mutually different resonance frequencies. Accordingly, a sound pressure level is ensured in a wider frequency band. Accordingly, the vibration device 1 is capable of ensuring the sound pressure level of each pitch and emitting a melody from the piezoelectric element 10 corresponding to the second position β.

The control unit 5 determines, among the plurality of piezoelectric elements 10, the piezoelectric element 10 corresponding to the first position α, the piezoelectric element 10 corresponding to the second position β, and the piezoelectric element 10 corresponding to the third position γ on the operation surface 3a different from the first position α and the second position β. The control unit 5 does not vibrate the piezoelectric element 10 corresponding to the third position γ while the piezoelectric element 10 corresponding to the first position α and the piezoelectric element 10 corresponding to the second position β are vibrated. According to this configuration, a sound is emitted from an appropriate position depending on the situation.

The plurality of piezoelectric elements 10 are arranged in a matrix. The piezoelectric elements 10 having the same resonance frequency are mutually adjacent in the row direction when viewed from the direction orthogonal to the operation surface 3a. The piezoelectric elements 10 having mutually different resonance frequencies are adjacent in the column direction. According to this configuration, the disposition of the wirings 31, 32, 33, and 34 with respect to the piezoelectric element 10 can be simplified. Accordingly, the size of the vibration device 1 can be further reduced.

The plurality of piezoelectric elements 10 are arranged in a matrix such that the piezoelectric elements 10 having mutually different resonance frequencies are adjacent in the row direction and the column direction when viewed from the direction orthogonal to the operation surface 3a. In this configuration, the piezoelectric elements 10 with different resonance frequencies are positioned in a dispersed manner, and thus a sound with a uniform sound pressure level is emitted in each direction from the vibration device 1.

Although an embodiment and modification examples of the present invention have been described above, the present invention is not necessarily limited to the above embodiment, and various changes can be made without departing from the gist thereof.

For example, the piezoelectric element 10 may be displaced by a force transmitted via the operation unit 3 pressed by the user U, and an electric signal generated by the displacement may be output to the control unit 5. In this case, the control unit 5 may control the plurality of vibration units 4 based on the signal output from the piezoelectric element 10. For example, the control unit 5 detects which piezoelectric element 10 is the signal output source from the signal output from the piezoelectric element 10 and acquires position information on the operation surface 3a touch-operated by the user U. The acquisition unit 21 of the control unit 5 acquires the signal output from the piezoelectric element 10 or the position information on the piezoelectric element 10. The piezoelectric element determination unit 22 of the control unit determines the piezoelectric element 10 corresponding to the first position α and the piezoelectric element 10 corresponding to the second position β based on the position information.

In the vibration device 1 illustrated in FIGS. 6, 7, and 8, the plurality of piezoelectric elements 10 include the three groups of piezoelectric elements 10 with mutually different resonance frequencies. Alternatively, the plurality of piezoelectric elements 10 may include two groups of piezoelectric elements 10 with mutually different resonance frequencies. The plurality of piezoelectric elements 10 may include four or more groups of piezoelectric elements 10 with mutually different resonance frequencies.

In the vibration device 1 illustrated in FIGS. 6 and 7, the piezoelectric elements 10 with mutually different resonance frequencies are arranged for each row. Alternatively, the piezoelectric elements 10 with mutually different resonance frequencies may be arranged for each of a plurality of rows. For example, the plurality of piezoelectric elements 10 may be arranged in the order of the piezoelectric element A, the piezoelectric element A, the piezoelectric element B, the piezoelectric element B, the piezoelectric element C, and the piezoelectric element C in the column direction.

In the vibration device 1 illustrated in FIGS. 6 and 7, the long side direction of the operation surface 3a is the row direction, and the short side direction of the operation surface 3a is the column direction. Alternatively, the long side direction of the operation surface 3a may be the column direction, and the short side direction of the operation surface 3a may be the row direction.

In the vibration device 1 illustrated in FIG. 8, the piezoelectric elements 10 with the same resonance frequency are regularly disposed so as to be dispersed. Alternatively, the piezoelectric elements 10 with the same resonance frequency may be disposed irregularly. For example, the disposition of the plurality of piezoelectric elements 10 may be randomly determined by software or the like.

The control unit 5 may cause the piezoelectric element 10 corresponding to the first position α to perform both tactile vibration and sound-emitting vibration. For example, the control unit 5 may cause the piezoelectric element 10 positioned directly below the position operated by the user U to vibrate to emit a sound together with another piezoelectric element 10, and this vibration may be transmitted to the user U via the operation surface 3a. The control unit 5 may cause the piezoelectric element 10 positioned directly below the position operated by the user U to perform sound-emitting vibration immediately after performing tactile vibration.

REFERENCE SIGNS LIST

1: vibration device, 3: operation unit, 3a: operation surface, 5: control unit, 10, A, B, C: piezoelectric element, U: user, α: first position, β: second position, γ: third position.

The invention claimed is:
1. A vibration device comprising:
an operation unit having an operation surface operated by a user;
a housing forming an accommodation space between the operation unit and the housing;
a plurality of piezoelectric elements disposed so as to overlap the operation surface when viewed from a direction orthogonal to the operation surface and disposed so as to be separated from each other at different positions in the accommodation space in a direction along the operation surface; and
a control unit arranged to control the plurality of piezoelectric elements, wherein
the plurality of piezoelectric elements are disposed in the accommodation space and include a plurality of first piezoelectric elements and a plurality of second piezoelectric elements,
the plurality of first piezoelectric elements and the plurality of second piezoelectric elements are displaced at different positions when viewed from the direction orthogonal to the operation surface,
frequency characteristics of the first piezoelectric elements and the second piezoelectric elements have peaks at different frequencies, the control unit is arranged to vibrate, at a first frequency, a piezoelectric element displaced at a position overlapping an operation position on the operation surface when viewed from the direction orthogonal to the operation surface and vibrate, at a second frequency different from the first frequency, a plurality of piezoelectric elements displaced at positions not overlapping the operation position simultaneously, in response to an operation of the operation position by the user, and the second frequency is a frequency in an audible range having a synthesized waveform that is a composite of the frequency characteristics of the first and second piezoelectric elements.

2. The vibration device according to claim 1, wherein each of the piezoelectric elements has a resonance frequency in an audible range.

3. The vibration device according to claim 2, wherein the first frequency at which the piezoelectric element corresponding to the first position is vibrated is lower than the resonance frequency of the piezoelectric element.

4. The vibration device according to claim 1, wherein
the plurality of piezoelectric elements include at least two piezoelectric elements having mutually different resonance frequencies, and
the control unit is arranged to output a drive signal in which at least one of a waveform of a drive signal vibrating the piezoelectric element corresponding to the first position, an intensity of the drive signal, and a frequency of the drive signal is determined based on a resonance frequency of the piezoelectric element corresponding to the first position.

5. The vibration device according to claim 1, wherein the plurality of piezoelectric elements include a plurality of piezoelectric elements having a first resonance frequency and a plurality of piezoelectric elements having a second resonance frequency different from the first resonance frequency.

6. The vibration device according to claim 1, wherein the plurality of piezoelectric elements include at least three piezoelectric elements each having a different resonance frequency.

7. The vibration device according to claim 1, wherein
the control unit is arranged to determine, among the plurality of piezoelectric elements, the piezoelectric element corresponding to the first position, a piezoelectric element corresponding to a second position different from the first position on the operation surface, and a piezoelectric element corresponding to a third position on the operation surface, the third position being different from the first position and the second position, and
the control unit is arranged not to vibrate the piezoelectric element corresponding to the third position while the piezoelectric element corresponding to the first position and the piezoelectric element corresponding to the second position are vibrated.

8. The vibration device according to claim 1, wherein the plurality of piezoelectric elements are arranged in a matrix such that piezoelectric elements having the same resonance frequency are mutually adjacent in a row direction and piezoelectric elements having mutually different resonance frequencies are adjacent in a column direction when viewed from the direction orthogonal to the operation surface.

9. The vibration device according to claim 1, wherein the plurality of piezoelectric elements are arranged in a matrix such that piezoelectric elements having mutually different resonance frequencies are adjacent in a row direction and a column direction when viewed from the direction orthogonal to the operation surface.

10. A vibration device comprising:
an operation unit having an operation surface operated by a user;
a plurality of piezoelectric elements disposed so as to overlap the operation surface when viewed from a direction orthogonal to the operation surface and disposed so as to be separated from each other at different positions in a direction along the operation surface; and
a control unit arranged to control the plurality of piezoelectric elements, wherein
the operation surface includes a plurality of mutually different positions each corresponding to and overlapping, in the direction orthogonal to the operation surface, a respective one of the plurality of piezoelectric elements,
when an operation is performed only on a first position of the plurality of mutually different positions on the operation surface by the user, the control unit vibrates both a first piezoelectric element and a second piezoelectric element, different from the first piezoelectric element, among the plurality of piezoelectric elements, the first piezoelectric element corresponding to the first position, the second piezoelectric element corresponding to a second position of the plurality of mutually different positions on the operation surface different from the first position, the control unit vibrating the first piezoelectric element at a first frequency and vibrating the second piezoelectric element at a second frequency different from the first frequency,
frequency characteristics of the first piezoelectric element and the second piezoelectric element have peaks at different frequencies,
the second frequency is a frequency in an audible range having a synthesized waveform that is a composite of the frequency characteristics of the first and second piezoelectric elements.

11. The vibration device according to claim 1, wherein, when the operation is performed only on the operation position, the control unit vibrates both the piezoelectric element displaced at the position overlapping the operation position and the plurality of piezoelectric elements displaced at positions not overlapping the operation position simultaneously.

* * * * *